April 22, 1941.  F. A. OLMSTEAD  2,239,114
MACHINE FOR MAKING CHAINS
Filed Aug. 2, 1939   6 Sheets-Sheet 1

INVENTOR.
FREDERICK A. OLMSTEAD
BY
Kwis Hudson & Kent
ATTORNEYS

April 22, 1941.   F. A. OLMSTEAD   2,239,114
MACHINE FOR MAKING CHAINS
Filed Aug. 2, 1939   6 Sheets-Sheet 2

INVENTOR.
FREDERICK A. OLMSTEAD
BY Kwis Hudson & Kent
ATTORNEYS

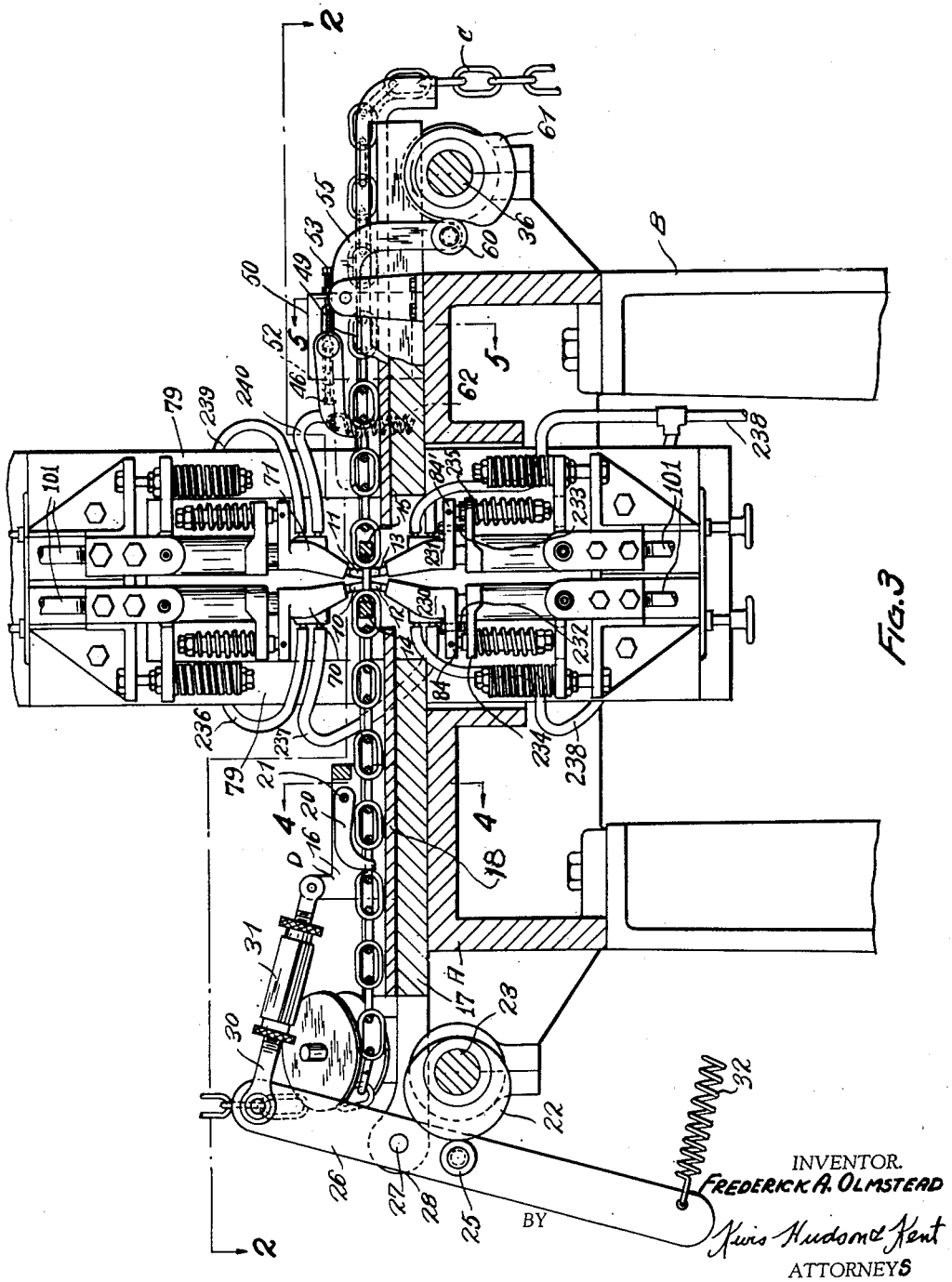

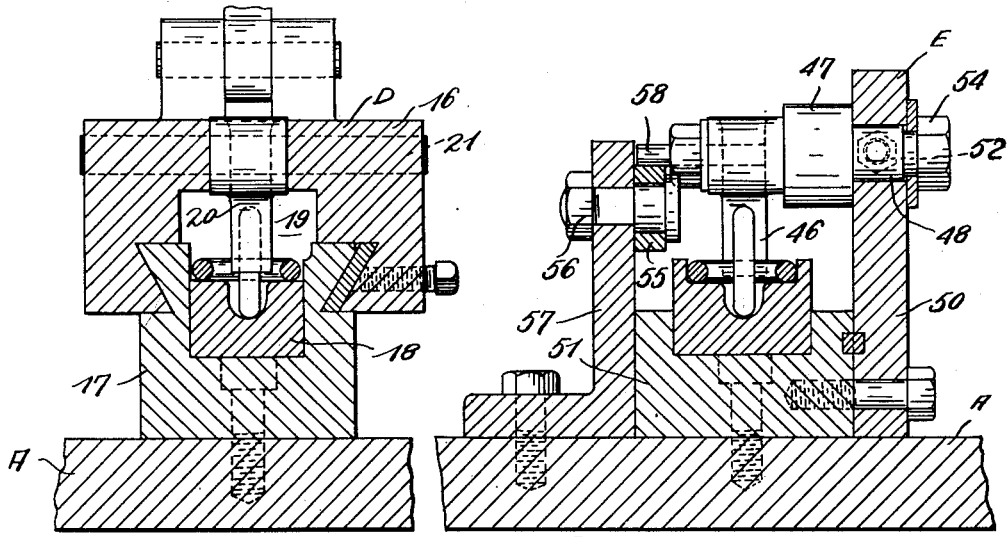
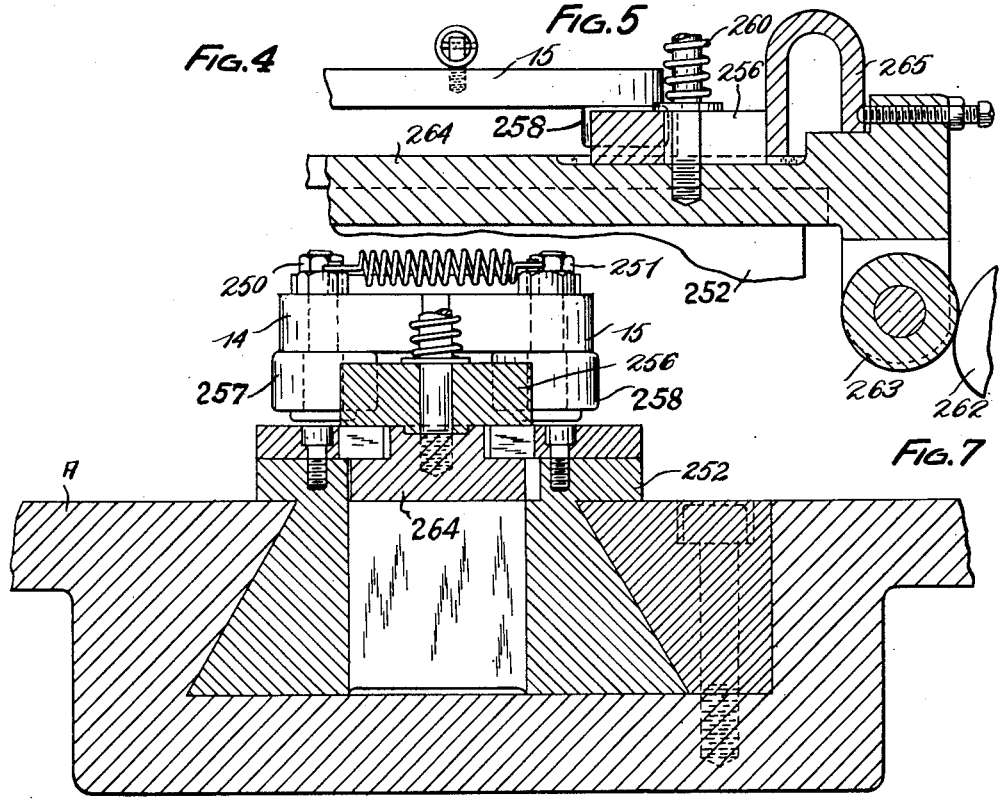
INVENTOR.
FREDERICK A. OLMSTEAD
BY Kwis Hudson & Kent
ATTORNEYS

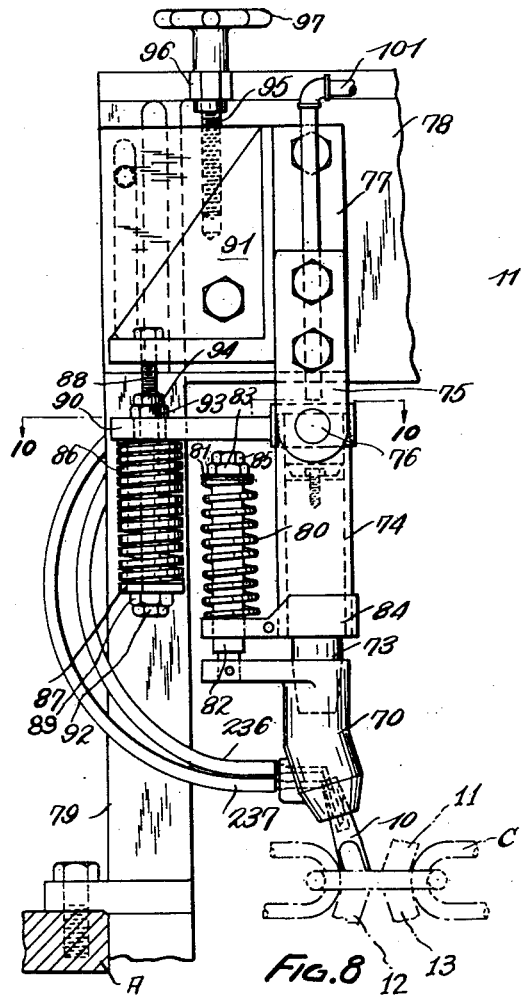
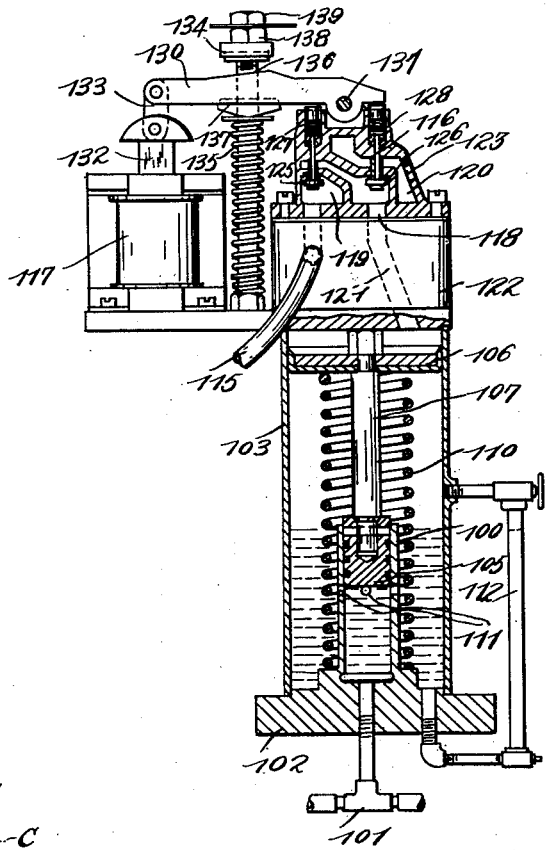
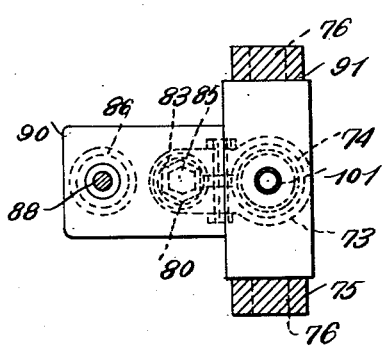

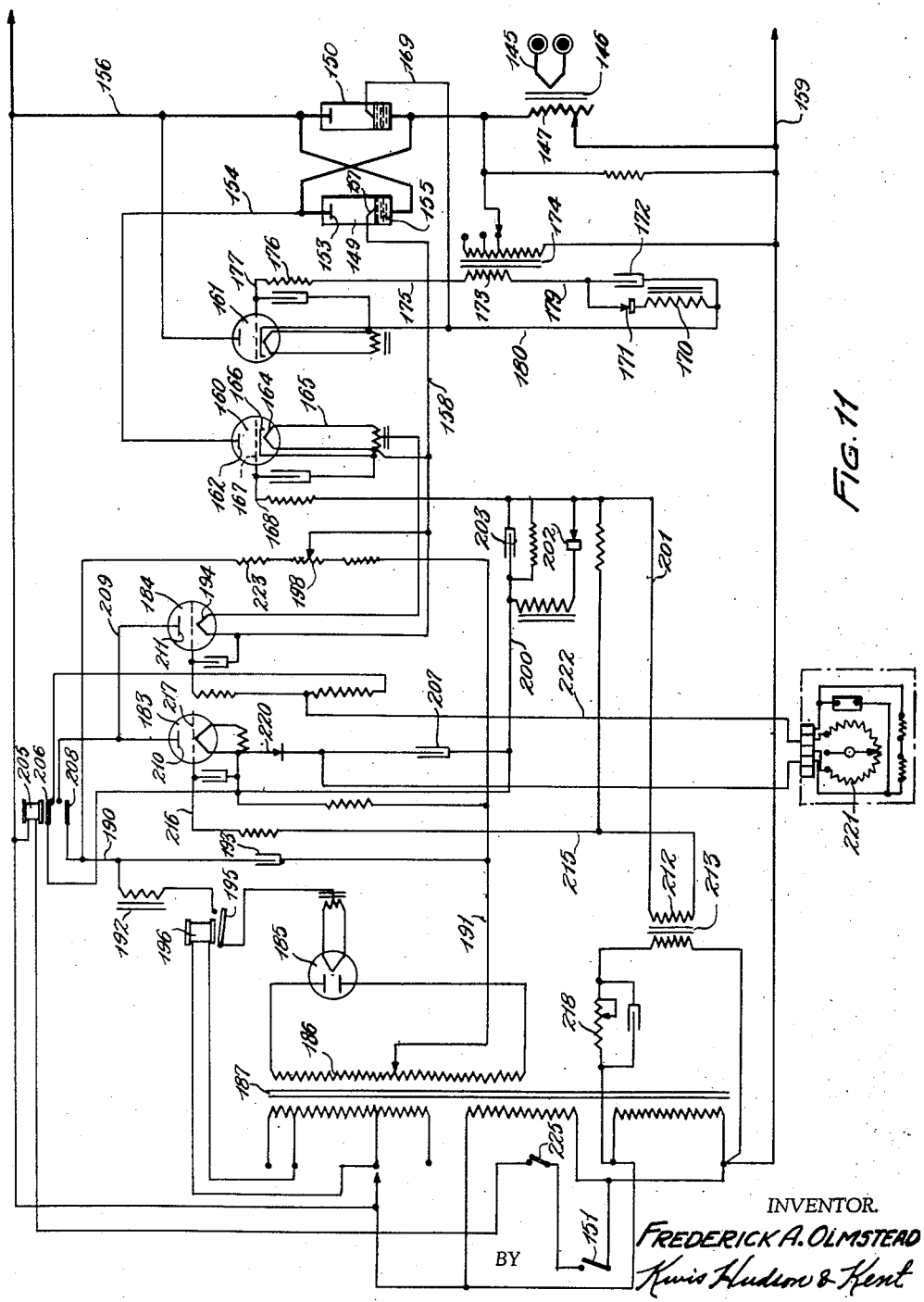

Patented Apr. 22, 1941

2,239,114

UNITED STATES PATENT OFFICE 2,239,114

MACHINE FOR MAKING CHAINS

Frederick A. Olmstead, Cleveland Heights, Ohio, assignor to The Hodell Chain Company, Cleveland, Ohio, a corporation of Ohio Application August 2, 1939, Serial No. 287,987

3 Claims. (Cl. 219—5)

The present invention relates to welded chain links, and more particularly to a method and machine for making the same.

Heretofore in the art the heat produced in electrically welding the butt ends of the chain links affected or changed the characteristics of a large portion, if not all, of the material or metal of the link. This is especially true of heat treated links and chains made therefrom, and the principal object of the present invention is the provision of a method of butt welding chain links which will leave a maximum amount of the material of the link in its original condition and which method is especially applicable to high speed production and improved quality.

Another object of the present invention is the provision of a new and improved machine for producing welded chain links or chains comprising welded links which will be simple and rugged in construction, reliable in operation and which will have a high production of links or chains of improved quality.

Further objects and advantages of the present invention will be apparent to those skilled in the art to which the invention relates from the following description of the preferred embodiment thereof described with reference to the accompanying drawings, in which:

Fig. 3 is a sectional view on the line 3—3 of Fig. 2 with portions shown in elevation.

Fig. 4 is a sectional view on the line 4—4 of Fig. 3.

Fig. 5 is a sectional view on the line 5—5 of Fig. 3.

Fig. 6 is a sectional view on the line 6—6 of Fig. 2.

Fig. 7 is a section on the line 7—7 of Fig. 2.

Fig. 8 is an enlarged front elevation of a portion of Fig. 1.

Fig. 9 is a side elevation of a portion of Fig. 1, with parts shown in section, on the line 9—9 of Fig. 1.

Fig. 10 is a sectional view approximately on the line 10—10 of Fig. 8; and

Fig. 11 is a wiring diagram of the electrical circuits of the machine.

The machine herein shown and described is particularly adapted for making electrically butt welded chain from previously assembled links.

Figure 1:
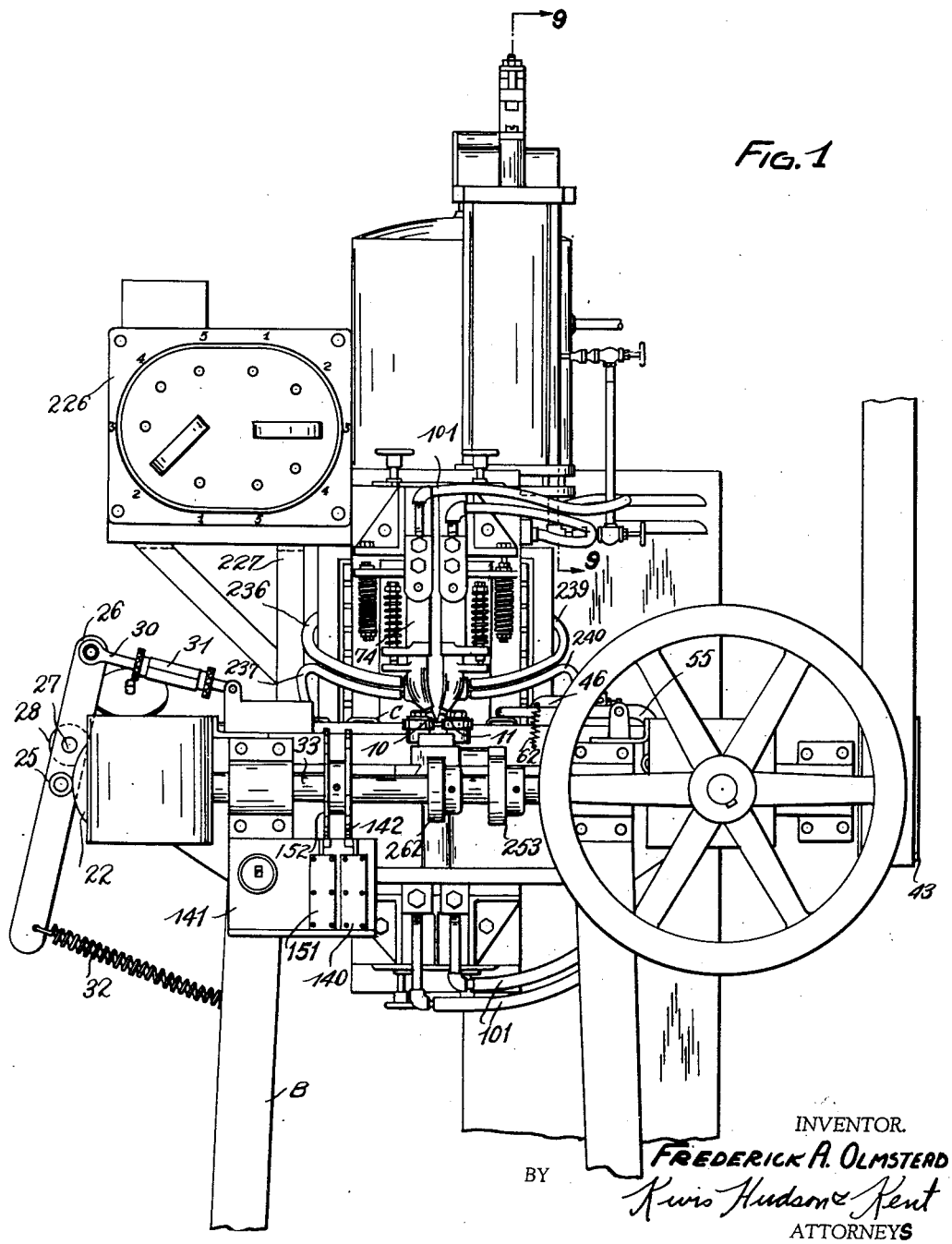
Fig. 1 is a front elevation of a machine embodying the present invention and suitable for practicing the present method.
Figure 2:
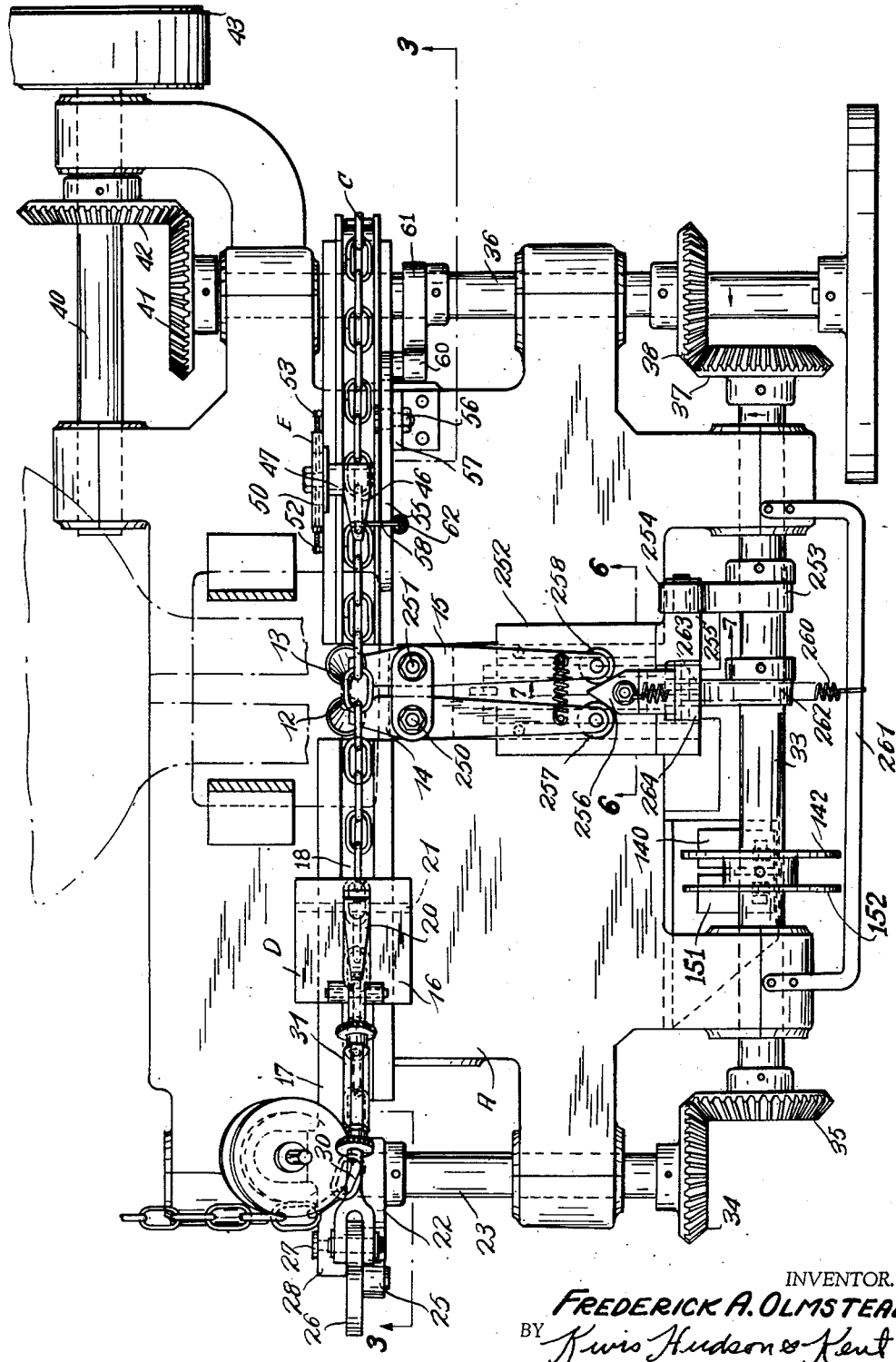
Fig. 2 is a plan sectional view of the machine shown in Fig. 1 approximately on the line 2—2 of Fig. 3.

Referring to the drawings, the reference character A designates the bed of the machine, which bed is supported a convenient distance above the floor by suitable legs B. The assembled links designated generally by the reference C are fed through the machine from right to left, as viewed in Figs. 1, 2 and 3, by feeding mechanism designated generally by the reference character D and tensioning mechanism E. As alternate links are intermittently advanced into welding position, that is, to a position intermediate the upper electrodes 10 and 11 and the lower electrodes 12 and 13 the electrodes are moved to engage opposite sides of the butt ends of the blank in a manner hereinafter more specifically referred to, the electrical current is instantaneously applied, and the adjacent butt ends are forced together by the members 14 and 15 which advance automatically into engagement with opposite ends of the link after the link comes to rest in the welding position. As soon as the weld is completed, the electrodes are moved free of the link, the members 14 and 15 retracted, and the next alternate link moved into welding position. According to the present invention, the various operations referred to above are performed at a high rate of speed and the welding current is such that only a small amount of the material of the link adjacent the weld is affected.

The chain feeding mechanism D comprises a rectangular member 16 slidably supported on a member 17 fixed to the upper surface of the bed A, which member also carries a guide 18 for the chain, located in a groove in its upper surface. The member 16 has an aperture 19 therein through which the chain passes, and is provided with a pawl 20 pivotally supported on a pin 21 fixed therein. The pawl 20 is so formed and constructed that it engages the rear end of a vertical link when the member 16 is moved towards the left, as viewed in Figs. 1, 2 or 3, and rides over the succeeding vertical link when the member 16 is moved in the reverse direction. The member 16 is adapted to be reciprocated to intermittently advance the links to be welded into the welding position and to remove the welded links therefrom by a cam 22 carried by a transversely extending shaft 23 rotatably supported in suitable journal boxes on the bed A. The cam 22 is continuously engaged by a roller 25 on a lever 26 pivotally supported on a pin 27 fixed in a boss 28 formed on the left hand end of the member 17. The upper end of the lever 26 is connected to the member 16 by a link 30 which includes a turnbuckle 31 for adjusting the length thereof. The roller 25 is located below the pivot 27 and is held in engagement with the cam 22 by a tension spring 32 fixed to the lower end of the lever 26 and to one of the legs or some other suitable part of the frame of the machine.

The shaft 23 is operatively connected to a longitudinally extending shaft 33 rotatably supported in journal boxes at the front of the bed A, by miter gears 34 and 35. The shaft 33 is in turn operatively connected to a transversely extending shaft 36 supported in suitable bearings at the right hand side of the bed A by miter gears 37 and 38. As shown the shaft 36 is driven from a shaft 40 rotatably supported in suitable bearings along the rear right hand part of the bed A, to which shaft it is connected by miter gears 41 and 42. The shaft 40 is adapted to be driven from a drive pulley 43.

In order to prevent the feeding mechanism from overfeeding the chain, tensioning mechanism E previously mentioned, is provided. This mechanism includes a pawl 46 pivotally connected to a member 47 having a reduced portion 48 which projects through a horizontal slot 49 in a vertically projecting member 50 bolted to a member 51 fixed to the upper surface of the bed A. The member 47 is adapted to be adjusted longitudinally of the slot 49 by adjusting screws 52 and 53, the adjacent ends of which engage opposite sides of the reduced portion 48 of the member 47. The member 47 is adapted to be secured in any adjusted position by a bolt 54 adapted to clamp the same against the member 50. The free end of the pawl 46 is adapted to normally engage the front or left hand end of a vertical link and prevent the chain from moving forward. The pawl 46 is adapted to be raised intermittently to allow the chain to be fed, by a lever 55 pivotally carried by a shouldered bolt 56 fixed in a suitable aperture in the upper end of a vertically extending member 57 attached to the upper surface of the bed A. The left hand end of the lever 55, as viewed in Figs. 2 and 3, projects underneath a pin 58 fixed in the pawl 46 and the right hand end of the lever 55 which is bent at right angles to the main portion thereof carries a roller 60 adapted to be engaged by a cam 61 fixed to the shaft 36. The pawl 46 is continuously urged in a downward direction by a tension spring 62 fixed thereto and to the bed A. The construction is such that upon each rotation of the shaft 36, the cam 61 actuates the lever 55 to raise the pawl 46 for a short period of time, during which period the chain is advanced or fed one step, that is two links, by the feeding mechanism D previously described.

As shown, the electrodes are adapted to be reciprocated to engage and disengage the links by fluid pressure means, which in the present instance, is a combination of compressed air and oil. Similar electrode assemblies are employed above and below the path of the chain, so only one will be referred to in detail. The upper electrodes 10 and 11 are fixed to the lower ends of the members 70 and 71, respectively, which members are identical except for the fact that they converge towards their lower ends, making one of them right hand and the other left hand. Aside from this difference, the mechanism for supporting and moving the electrodes of the upper electrode assembly is identical and only the left hand mechanism will be described in detail.

The member 70 is fixed to the lower tapered end of a plunger or piston 73 reciprocable within a cylinder 74 pivotally connected to the lower end of a member 75 by a pivot pin 76. The member 75 is bolted to a plate 77 slidably supported on a plate or bracket 78 fixed to the upper end of vertical members 79, the lower ends of which are secured to the bed A. The piston 73 is moved in a downward direction by fluid pressure in a manner hereinafter more specifically referred to, to cause the electrode 10 to engage the link to be welded, which is the position shown in Fig. 8, and is returned to its original position by a compression spring 80 interposed between a washer 81 at the upper end of a threaded rod 82 underneath the nuts 83 and 85 and a member 84 fixed to the lower end of the cylinder 74. The pivot pin 76 permits the electrodes to move along with the ends of the link as they are forced together by the members 14 and 15 during the welding operation, as will be hereinafter apparent.

At the end of the welding operation, the electrodes are returned to their original position by a compression spring 86 interposed between a washer 87 secured to the lower end of a bolt 88 by a nut 89 and a member 90 fixed to the upper end of the cylinder 74. The bolt 88 is fixed in a bracket 91 which in turn is secured to the member 77. The tension of the spring 86 can be varied by the adjusting nut 89 adapted to be secured in any adjusted position by the lock nut 92. The position to which the member 90, and in turn the electrode 10, are returned by the spring 86 is determined by nut 93 threaded on the bolt 88 above the member 90 and against which the member 90 is adapted to normally abut. The nut 93 can be secured in any adjusted position by a lock nut 94. The member or plate 77 is slidably supported on the bracket 78 and is adapted to be moved or adjusted vertically therealong by a threaded rod 95 rotatably supported in a boss 96 formed on the plate 78, the lower end of which rod is threaded into a suitable aperture in the plate 77. The upper end of the rod 95 is provided with a hand wheel 97 to facilitate adjustment of the plate 77 relative to the plate 78.

The upper end of the cylinder 74 is connected to the lower end of a cylinder 100 by a conduit 101. The cylinder 100 is open at its upper end and is formed integral with a member 102 which forms the lower end of a larger cylinder 103 which surrounds the smaller cylinder 100. The small piston 105 which operates in the small cylinder 100 and the large piston 106 which operates in the large cylinder are rigidly connected together by a rod 107 and move as a unit. Both pistons are continuously urged in an upward direction by a compression spring 110 located in the large cylinder underneath the piston. The large cylinder 103 is partly filled with oil and is in communication with the small cylinder 100 by ports 111 formed in the wall of the cylinder 100, when the pistons are in their elevated position. A sight gauge 112 gives a visual indication of the amount of oil in the cylinder 103 which oil is always maintained above the ports 111.

The upper end of the cylinder 103 is adapted to be connected alternately to a high pressure air line 115 and to atmosphere through the medium of a solenoid-operated valve 116, the solenoid 117 of which is periodically energized in timed relation to the other operations of the machine, as will be later apparent. The valve 116 is of commercial construction and will not be described in detail. Suffice it to say that the valve contains three chambers 118, 119 and 120, the first of which is in constant communication with the upper end of the cylinder 103 by a conduit 121 in a member 122 which forms a base for the valve 116 and its operating solenoid 117. The chamber 119 is continuously connected to the high pressure air line 115 and the chamber 120 is open to atmosphere through the port 123. The chamber 118 is adapted to be alternately connected to the chambers 119 and 120 by normally closed valves 125 and 126, respectively. The valves 125 and 126 are continuously urged into a closed position by compression springs 127 and 128, respectively, operatively connected thereto. The upper end of the valves project through the housing and engage the underside of the lever 130 pivotally supported on a pin 131 fixed in the valve casing intermediate the valves 125 and 126. The left hand end of the lever 130, as viewed in Fig. 9, is secured to the armature 132 of the solenoid 117 by a link 133. The construction is such that when the solenoid 117 is energized, the inlet valve 125 is opened, connecting the upper end of the cylinder 103 with the high pressure air line 115. This forces the pistons 105 and 106 in a downward direction, placing the oil trapped in the cylinder 100 under extremely high pressure, which pressure is transmitted through the conduit 101 to the upper end of the plunger or piston 73 which moves the piston to engage the electrode 10 with the link to be welded.

Upon deenergization of the solenoid 117 the lever 130 is rotated in a clockwise manner about the pivot pin 131 by a compression spring 135 surrounding a rod 136 fixed in the member 122 and engaging against a rocker member 137 interposed therebetween and the underside of the member or lever 130. Movement of the member 130 in a clockwise direction closes the inlet valve 125 and opens the exhaust valve 126, relieving the pressure in the cylinder 103. The spring 110 returns the pistons to their original positions, and the electrode 10 is returned to its original position by the spring 80. The rotation of the lever 130 about its pivot pin 131 in a clockwise direction is limited by a member 134 underneath a nut 138 on the upper end of the rod 136 and adapted to be secured in any adjusted position by a lock nut 139. The energization of the solenoid 117 is controlled by a normally open switch 140 fixed to a plate 141 welded or otherwise secured to the base of the machine A. The switch 140 is periodically closed instantaneously in timed relation to the other operations of the machine by a cam 142 fixed to the shaft 33.

As previously stated the mechanism for supporting and moving the right hand electrode 11 is similar to the mechanism just described for supporting and moving the left hand electrode 10 and the corresponding parts are indicated by the same reference characters with a prime mark affixed thereto. The conduit 101 which connects the upper end of the cylinder 74 with the lower end of the cylinder 100 also connects the upper end of the cylinder 74' with the cylinder 100. Both electrodes 10 and 11 operate in unison and engage the link to be welded at opposite sides of the weld. While the electrodes are in contact with the link a predetermined number of cycles of alternating electric current is passed therethrough and the ends of the link forced together to form the weld. The number of cycles of current employed is preferably from approximately two to ten cycles, depending upon the size of the chain, etc. The electrodes 10 and 11 are connected in series circuit with the secondary 145 of a welding transformer 146 provided with a plurality of taps through the medium of which the voltage thereof may be varied in steps of $\frac{1}{16}$ of a volt from about 7 to 8 volts.

The power current is carried and interrupted by a plurality of gas discharge power devices or tubes 149 and 150 which perform the function of a rapid action, single pole, single throw switch connected directly in series with the power source and the primary 147 of the welding transformer 146. Any gas discharge device which has a control element and a circuit responsive thereto and which has such operating characteristics that the controlled circuit passes substantially no current until fired by a small ignition current in the control circuit at the beginning of each half cycle of current in the control circuit, and which thereafter passes substantially full current for the duration of that particular half cycle, may be employed. The gas discharge devices or tubes 149 and 150 illustrated are of the type known commercially as "single anode ignitron" and consist of an envelope containing a pool of mercury at the lower end, which is the cathode, an anode at the upper end, and a small ignition electrode which dips into the mercury pool cathode. The tubes 149 and 150 which individually conduct in but one direction, are connected in parallel and inversely to one another, the combination serving to pass alternating current. Timing is accomplished entirely by an electronic circuit which functions during successive closures of a switch 151 fixed to the plate 141 and adapted to be closed in timed relation to the other operations of the machine by a cam disk 152 fixed to the shaft 33. This timing circuit measures out a predetermined number of cycles of welding current at each operation of the switch 151. In addition, welding current is initiated at a predetermined point in the voltage wave, regardless of time of closure of the welding switch. This point is made the natural zero of this current, that is, the power factor angle of the welding machine, and is of importance in short time welding.

Referring to the left hand tube 149, see Fig. 11, the tube consists of an anode 153 connected to a conductor 154, a mercury pool 155 which is the cathode and which is connected to one line 156 of the power source, and an igniter 157 which is connected to lead 158. When a current is passed from the igniter 157 to the cathode 155, the space inside the tube between the anode 153 and the cathode 155 is made conducting by ionization and if at that instant the potential of the anode 153 is sufficiently positive relative to the cathode 155, current will flow through the tube from the anode 153 to the cathode 155. After the flow of anode-cathode current is established, the magnitude of the current is limited only by the impedance of the welding transformer 146. The current will continue to flow through the tube during the remainder of the half cycle of A. C. voltage, during which the potential of the other line 159 of the power source is positive in relation to line 156, and may persist during a part of the next half cycle even though at that time the voltage of lead 159 has become negative relative to lead 156. The duration of current flow depends upon the power factor of the welding transformer 146. If the power factor is low, the current will continue to flow during nearly one-half of the following half cycle. If the power factor is high, the duration of current flow is decreased. In order to obtain the same amount of current during each half of the cycle, i. e., through each of tubes 149 and 150, it is important that during the first half cycle tube 149 be started at a voltage angle corresponding with the power factor of the load, which is accomplished in a manner hereinafter described.

The igniter current is supplied by two gas discharge devices or tubes 160 and 161 known commercially as "KU-676 Thyratron" tubes. Tube 160 is connected between the anode 153 and the igniter 157 of tube 149. Tube 161 is connected between the anode and the igniter of tube 150. The tube 160 consists of an anode 162 connected to conductor 154, a heater 164 connected to conductors 158 and 165, a cathode 166 connected to conductor 158, and a grid 167 connected to a conductor 168. The tube 160 is filled with mercury vapor, and conducts or does not conduct current depending upon the voltage between the grid 167 and the cathode 166. If the grid voltage is more negative than approximately 6 volts, the tube is an insulator and no current flows between the anode 162 and the cathode 166. If the grid voltage is made more positive than 6 volts, the tube becomes ionized and conducts current, provided the anode potential is positive in relation to the cathode after the flow of anode current is started, the grid does not have any control of the tube, and anode current therefore flows until the anode potential is lowered below the arc drop across the tube, which is approximately 15 volts. Tube 160 is connected between the anode 153 and the igniter 157 of tube 149. When the grid voltage of tube 160 is made more positive than 6 volts, igniter current flows through tube 160. When this occurs tube 149 is made conducting and the voltage drop between conductors 154 and 156 is decreased to equal the arc drop across tube 149. Because of this decrease in voltage, the igniter current through tube 160 is interrupted.

Tube 161 controls the igniter circuit 169 for tube 150. The grid circuit for tube 161 consists of a negative voltage of approximately 50 volts obtained from a rectifier circuit consisting of transformer winding 170, rectifier 171, and the smoothing capacitor 172. This negative voltage normally prevents current from flowing through tube 161. Winding 173 of the grid transformer 174 is also connected in series with the grid of tube 161 through a conductor 175, resistance 176, and conductor 177. When current flows through tube 149 and through the welding transformer 146, the voltage of lead 154 becomes positive relative to lead 159 at the end of the half cycle of current flow because of the inductance of the load. This makes conductor 175 of the grid transformer 174 positive relative to conductor 179, thus making the grid of tube 161 positive. For this reason, as soon as the load current is supplied, tube 149 becomes zero and full line voltage is applied across conductors 156 and 180 with conductor 156 positive, the grid of tube 161 already positive, and tube 161 therefore becomes ionized and conducts igniter current to tube 150, thus starting tube 150. From the foregoing it may be seen that tube 161 and tube 150 are controlled by a "follow-up" circuit initiated by current flow through tube 149, so that each half cycle of current conducted through tube 149 is followed by one-half cycle of current through tube 150.

The purpose of the timing circuit presently to be described is to make the grid of tube 160 positive at the proper phase angle, as determined by the power factor of the load, and to again make the grid of tube 160 negative after a predetermined number of cycles of A. C. current have passed through the load. The timing circuit employs two tubes 183 and 184 known commercially as "KU-627 Thyratron" tubes and one full wave mercury vapor filled rectifier tube 185 known commercially as "type 83." The rectifier tube 185 is connected across a 700 volt center tapped transformer winding 186 of transformer 187, and supplies D. C. voltage to conductors 190 and 191, conductor 190 being of positive polarity. The A. C. ripples in the rectified voltage are smoothed out by means of reactor 192 and capacitor 193. Contacts 195 of the timing relay 196 are connected in series with the reactor so that no D. C. voltage appears across capacitor 193 until the relay contacts 195 are closed.

The grid circuit for tube 160 may be traced from the cathode 194, to the tap of resistor 198, to conductors 191, 200, 201, and 168 to grid 167. It will be seen that a negative D. C. voltage supplied by rectifier 202 and smoothed out by capacitor 203 is always connected in the grid circuit of tube 160, and when contacts 195 are open, the D. C. voltage across capacitor 203 prevents tube 160 from conducting current. When contacts 195 are closed, an additional negative voltage consisting of the voltage drop across the top of resistor 198 and conductor 191 is introduced in the grid circuit for tube 160.

When the weld is to be started, relay 205 is energized by the externally mounted operating switch 151 opening the normally closed contacts 206 of relay 205, opening the discharge circuit in parallel with capacitor 207 while closing the normally open contacts 208 of relay 205, and applying D. C. voltage to conductor 209 to which are connected the anodes 210 and 211 of tubes 183 and 184, respectively. Tube 183 is the "start" tube and is controlled by the voltage produced by the secondary winding 212 of the impulse transformer 213. The grid circuit for tube 183 may be traced from 200 to 201, 215, and 216 to the grid 217. Because of the negative voltage across capacitor 203, the grid 217 of tube 183 becomes positive only during a few degrees of voltage angle when a sharp positive voltage impulse appears across impulse transformer winding 212. The location of this voltage impulse can be adjusted by means of resistor 218, so that with the resistor shorted out the impulse occurs at 90 degrees phase angle, and with all of resistor 218 in the circuit, the impulse occurs at 15 degrees phase angle, thus giving means to adjust the initial firing to agree with the power factor of the load.

After closure of the contacts 208 of relay 205 it will, therefore, be apparent that tube 183 breaks down and conducts current the first time a positive voltage impulse appears across the winding 212. When tube 183 breaks down, lead 200 assumes the potential of lead 209, except for the arc drop through tube 183, thus making the grid of tube 160 positive and in this manner starting the welding cycle. Current now flows through rectifier 220, and the timing potentiometer 221 to capacitor 207, and depending upon the adjustment of the timing potentiometer, capacitor 207 is charged up with lead 222 positive relative to lead 191. The more resistance in the timing potentiometer 221, the longer it will take for the voltage across capacitor 207 to reach a given value.

The "stop" tube 184 has a grid voltage consisting of the negative voltage between conductor 158 and conductor 191, and the positive voltage across capacitor 207. When the capacitor voltage has finally reached a value to make the grid voltage of tube 184 more positive than −4 volts, tube 184 breaks down and short-circuits resistor 223 and the upper part of resistor 198. This imposes a high negative voltage on the grid of tube 160, and welding current ceases to flow.

The purpose of the normally closed contacts 206 of relay 205 is to discharge capacitor 207 when relay 205 is deenergized between each welding operation. The power tubes 149 and 150 are water cooled and in order to prevent operation of the device without water a normally open flow switch 225 is connected in series with the switch 151. The control mechanism, with the exception of the timing potentiometer 221 which is located at the welding machine, is housed in a suitable cabinet, not shown, behind the machine. The welding transformer 146 is positioned directly behind the upper electrode assembly and the opposite terminals thereof are connected to the electrodes 10 and 11, respectively, by heavy flexible conductors, not shown. The taps for varying the voltage of the welding current are arranged on a panel 226 located in some convenient place adjacent the machine. In the present instance the panel 226 is secured to the frame of the machine by angle irons 227. The electrical equipment is commercially available and per se forms no part of the present invention. That illustrated and described is known commercially as a Westinghouse Type SP-11 Ignitron Spot Welding Timer. The connections shown are for operation from a 220 volt power source, however, the equipment is adaptable for operation with other voltages.

The lower electrode assembly (see Fig. 3) comprising the electrodes 12 and 13 is similar to the upper electrode assembly comprising the electrodes 10 and 11 already described, with the exception of the fact that in some instances it has been found desirable to maintain the lower electrodes stationary. For this purpose the members 230 and 231 of the lower electrode assembly which corresponds with the members 70 and 71 of the upper electrode assembly are provided with threaded apertures adapted to receive bolts 232 and 233, the lower ends of which bolts engage the members 234 and 235, respectively, which correspond to the members 84 and 84' of the upper electrode assembly. When the bolts 232 and 233 are in position the lower electrodes 12 and 13 remain in the upper position irrespective of the position of the upper electrodes 10 and 11. When the bolts 232 and 233 are removed the lower electrodes operate in unison with the upper electrodes, since the conduit 101 communicates with the lower ends of the cylinders of the lower electrode assembly as well as with the upper ends of the cylinders of the upper electrode assembly.

The lower electrode 12 is connected in parallel circuit with the upper electrode 10 and the lower electrode 13 is connected in parallel circuit with the upper electrode 11. All four electrodes are water cooled. For this purpose water is conducted to the upper electrode 10 by a conduit 236 connected thereto and to a water main. From the upper electrode 10 the water is conducted through the medium of a conduit 237 to the lower electrode 12 from which electrode it is conducted to a drain by a conduit 238. In a similar manner the upper electrode 11 is connected to a water main by a conduit 239. The upper and lower electrodes 11 and 13 are connected by a conduit 240 and the lower electrode 13 is also connected to a drain by the conduit 238. Suitable means is provided for controlling and regulating the supply of water.

As previously stated, the open ends of the link are forced together during the welding operation by the levers or members 14 and 15 pivotally supported on suitable pins 250 and 251 fixed in a member 252 slidably supported in a groove formed in the upper surface of the bed A. The member 252 is adapted to be reciprocated at right angles to the direction of movement of the chain by a cam 253 fixed to the shaft 33 and continuously engaged by a roller 254 carried by a boss 255 formed integral with the member 252. The members 14 and 15 are adapted to be rotated about their pivots 250 and 251 in timed relation to the other operations of the machine by a wedge-shaped member 256 slidably carried by a member 264. The wedge-shaped end of the member 256 engages between two rollers 257 and 258 rotatably supported in the rear ends of the levers 14 and 15, respectively. The member 264 and in turn the wedge-shaped member 256 are continuously urged towards the bottom of the sheet, as viewed in Fig. 2, by tension springs 260 connected thereto and to a bar 261 connected to the frame of the machine.

The members 256 and 264 are moved in the reverse direction in timed relation to the other operations of the machine by a cam 262 fixed to the shaft 33 and continuously engaged by a roller 263 rotatably supported on a pin fixed in the member 264. The member 264 is operatively connected to the member 256 through the medium of a heavy U-shaped spring member 265 which is adapted to provide a certain amount of give and thus compensate for variations in size of the chain links being welded. The construction is such that as a chain link to be welded is brought to the welding position, the cam 253 moves the members 14 and 15 inwardly so that the forward ends thereof, which are shaped to grip the ends of the links, are in a position to engage the link and force the butt ends of the link together. The electrodes are moved into welding position and the welding current passed therethrough. At the proper time, the wedge-shaped member 256 is advanced by the cam 262 to spread the rear ends of the members 14 and 15, thus causing the forward ends thereof to force the butt ends of the link together.

While the preferred embodiment of the invention has been described with considerable detail, I do not wish to be limited to the particular construction shown which may be varied within the scope of the invention. It is my intention to cover hereby all adaptations, modifications, and combinations thereof which come within the practice of those skilled in the art to which the invention relates and I particularly point out and claim as my invention the following:

1. In a machine for making welded wire chain, the combination of a frame, means for intermittently moving a plurality of assembled wire chain links through a welding station, a plurality of fluid pressure motors comprising relatively reciprocable members, electrodes carried by one of said members of each of said motors, said electrodes being adapted to be moved into engagement with opposite ends of the wire of a chain link in the welding station upon the application of fluid pressure to said motors, means for supplying to and exhausting fluid pressure from said motors in timed relation to the movement of the chain links through the welding station, means including an electronic control device for subjecting a chain link in the welding station to a welding current of a limited number of cycles of alternating current while said electrodes are in contact therewith, means for moving the ends of the wire of a chain link in the welding station towards each other while said electrodes are engaged therewith, and means for movably connecting said members of said fluid pressure motors other than the members to which the electrodes are operatively connected to said frame whereby said electrodes may move with the end of the wire of a chain link with which they are engaged.

2. In a machine for making welded wire chain, the combination of a frame, means for intermittently moving a plurality of assembled wire chain links through a welding station, a plurality of hydraulic motors comprising relatively reciprocable members, electrodes carried by one of said members of each of said motors, said electrodes being adapted to be moved into engagement with opposite ends of the wire of a chain link in the welding station upon the application of hydraulic pressure to said motors, means for supplying to and exhausting hydraulic pressure from said hydraulic motors in relation to the movement of the chain links through the welding station, means including an electronic control device for subjecting a chain link in the welding station to a welding current of a limited number of cycles of alternating current while said electrodes are in contact therewith, means for moving the ends of the wire of a chain link in the welding station towards each other while said electrodes are engaged therewith, and means for pivotally connecting said members of said hydraulic motors other than the members to which the electrodes are operatively connected to said frame whereby said electrodes may move with the end of the wire of a chain link with which they are engaged.

3. In a machine for making welded wire chain, the combination of a frame, means for intermittently moving a plurality of assembled wire chain links through a welding station, a plurality of hydraulic motors comprising relatively reciprocable members, electrodes carried by one of said members of each of said motors, said electrodes being adapted to be moved into engagement with opposite ends of the wire of a chain link in the welding station upon the application of hydraulic pressure to said motors, an air pressure actuated motor, means including a valve for supplying to and exhausting air pressure from said air pressure actuated motor including means for actuating said valve in relation to the movement of the chain links through the welding station, a reciprocating hydraulic pump, a conduit connecting said hydraulic motors and said hydraulic pump, means for operatively connecting said air pressure actuated motor with said hydraulic pump whereby the application of air pressure to said air pressure actuated motor operates said fluid pump to create hydraulic pressure in said hydraulic motors, means including an electronic control device for causing a predetermined number of cycles of alternating current to flow through said electrodes while said electrodes are in contact with a chain link in the welding station, means for moving the ends of the wire of a chain link in the welding station towards each other while said electrodes are engaged therewith, and means for pivotally connecting said members of said hydraulic motors other than the members to which the electrodes are operatively connected to said frame whereby said electrodes may move with the end of the wire of a chain link with which they are engaged.

FREDERICK A. OLMSTEAD.